United States Patent
Witheridge

(10) Patent No.: US 7,267,328 B2
(45) Date of Patent: Sep. 11, 2007

(54) AERATION OF WASTEWATER PONDS USING AIRLIFT PUMPS

(76) Inventor: Anthony John Witheridge, 330 H. Jefferson St., Batavia, IL (US) 60510

( * ) Notice: Subject to any disclaimer, the term of this patent is extended or adjusted under 35 U.S.C. 154(b) by 45 days.

(21) Appl. No.: 11/110,399

(22) Filed: Apr. 20, 2005

(65) Prior Publication Data

US 2005/0242450 A1    Nov. 3, 2005

Related U.S. Application Data

(60) Provisional application No. 60/564,421, filed on Apr. 22, 2004.

(51) Int. Cl.
*B01F 3/04* (2006.01)
(52) U.S. Cl. ............... 261/77; 261/121.1; 261/123; 261/126
(58) Field of Classification Search ............ 261/77, 261/121.1, 122.1, 123, 126, 29, 35, 36.1
See application file for complete search history.

(56) References Cited

U.S. PATENT DOCUMENTS

| | | | | |
|---|---|---|---|---|
| 618,243 A * | 1/1899 | Taylor | ............ | 417/150 |
| 708,058 A * | 9/1902 | Martinson | ............ | 261/77 |
| 3,228,526 A * | 1/1966 | Ciabattari et al. | ....... | 210/221.1 |
| 3,759,669 A * | 9/1973 | Aaron et al. | ............ | 422/215 |
| 3,790,141 A * | 2/1974 | Champeau | ............ | 261/77 |
| 3,938,738 A * | 2/1976 | Nagel et al. | ............ | 239/9 |
| 3,968,086 A * | 7/1976 | Romanowski | ............ | 261/77 |
| 4,070,423 A * | 1/1978 | Pierce | ............ | 261/77 |
| 4,293,506 A * | 10/1981 | Lipert | ............ | 261/77 |
| 4,455,232 A | 6/1984 | Reid | | |
| 4,707,308 A | 11/1987 | Ryall | | |
| 4,917,832 A * | 4/1990 | Marcum et al. | ............ | 261/77 |
| 4,966,705 A | 10/1990 | Jamieson | | |
| 5,139,659 A * | 8/1992 | Scott | ............ | 210/169 |
| 5,593,574 A | 1/1997 | Van Toever | | |
| 5,755,976 A * | 5/1998 | Kortmann | ............ | 210/747 |
| 5,811,011 A | 9/1998 | Ciszczon | | |
| 5,938,983 A | 8/1999 | Sheaffer | | |
| 6,068,773 A | 5/2000 | Sheaffer | | |
| 6,162,020 A | 12/2000 | Kondo | | |
| 6,237,898 B1 * | 5/2001 | Lafont | ............ | 261/77 |
| 6,514,410 B1 | 2/2003 | Gantzer | | |
| 6,569,338 B1 | 5/2003 | Ozyboyd | | |

* cited by examiner

*Primary Examiner*—Scott Bushey

(57) ABSTRACT

The subject of this invention is a submerged airlift pump using multiple concentric pipes with diameters that increase as they near the water surface. Water initially accelerated into the lowest pipe section is progressively decelerated in subsequent pipe sections, increasing the residence time of the bubbles and hence the total driving force of the pump. Pipe proportions are optimized with gas flows to maximize total pump discharge at extremely low pumping-heads, resulting in ultra-high pumping efficiencies. This device can be used to promote circulation of large volumes of deep pond water, deficient in oxygen, to the surface, creating an increase in the exchange of gases between the atmosphere and water with minimal energy requirements.

20 Claims, 1 Drawing Sheet

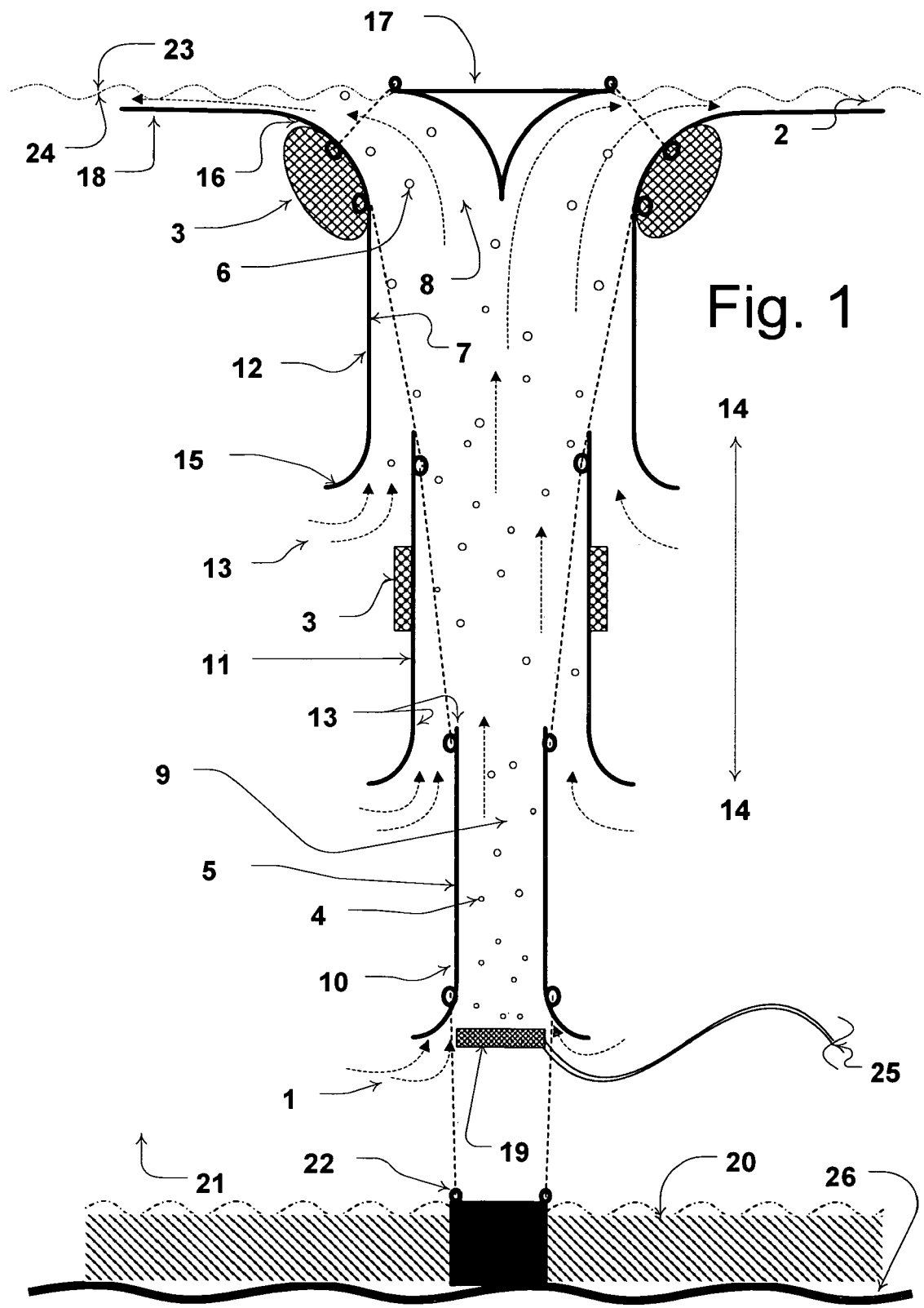

AERATION OF WASTEWATER PONDS USING AIRLIFT PUMPS

This application is a provisional application of Ser. No. 60,564,412 filed on Apr. 22, 2004.

BACKGROUND

This invention relates to a more energy efficient aeration of pond waters for the purpose of increasing the exchange of gases between the atmosphere and water. Using this invention the oxygen uptake into the total water volume of a pond can be increased significantly, and this increase in oxygen availability accelerates biological activity within the pond. Improved capacity for biological activity subsequently improves water quality, minimizes odor, and improves ultimate water quality. The invention is primarily but not exclusively targeted at increasing the biological degradation of organics in wastewater.

The treatment of wastewaters in surface impoundments can be performed by a method commonly referred to as an "extended aeration pond", also called "facultative ponds", wherein, the wastewater is allowed to settle in a pond, which is typically deeper than six meters. The denser wastewater (20) and its contained suspended solids normally sink to the bottom of the pond, and because of their high concentration and subsequent absence of free oxygen, then commence to degrade anaerobically. This anaerobic bottom layer (20) is relatively thin and significantly more dense than the upper layer (21) that contains the bulk of the pond's water, which is ideally and predominately engaged in "aerobic processes". It is in this upper aerobic layer that microbes consume dissolved oxygen to convert much of the organics in the wastewater into gases such as nitrogen and carbon dioxide, which ultimately escape from the water into the atmosphere. These decomposable organics are referred to and reported in water quality testing as "biological oxygen demand" (BOD).

For aerobic processes to function efficiently on an industrial scale, large volumes of gasses need to be both absorbed into the water and released from it. This gaseous exchange rate is a limiting factor in maximizing removal of BOD in wastewater, and this invention is targeted at accelerating the gas exchange that is achievable at the surface of a pond. The capacity of this invention to decrease BOD levels is logically limited by the pond's surface area and not a linear function of the minimal volume of compressed air used by the invention's airlift pump, however, the BOD reduction capacity using this invention is several times that of natural ponds. To fully maximize the air/water surface area and hence the gas exchange rates, many wastewater facilities inject very large volumes of compressed air into bubbling systems capable of achieving highly turbulent conditions. When comparing energy usage per mass of BOD destroyed, these techniques are very high-energy alternatives.

The main mechanism for gas interchange between water and air occurs at the surface (23) of the two phases. The exchange rate is roughly proportional to the surface area and to the difference in the partial gas pressures between the two phases (23, 24). For example, the partial pressure of oxygen in air is approximately 0.18 atmospheres, which is about the same partial pressure of water containing 8 ppm of oxygen. Therefore, surface waters, which contain typically 7 ppm of oxygen are almost saturated and cannot be expected to rapidly absorb additional oxygen. Similarly, water with an oxygen partial pressure of one ppm would be expected to absorb oxygen at seven times the rate of water containing 7 ppm of oxygen.

By bubbling the air at greater distance below the surface, the partial pressures can be increased but this requires greater compressed air pressures and increased energy consumption. e.g. At a depth of 11 meters the pressure is two atmospheres, and the water should equilibrate to about 16 ppm. Unless the bubbles are unusually small, the bubbles rise rapidly to the surface and their opportunity for gaseous exchange is brief, e.g. at an bubble injection depth of 6 meters only 12% of the available oxygen is absorbed before the bubbles reach the surface. Thus extended aeration ponds that depend on bubbling air need to pump about eight times the actual volume of air required.

Another means of increasing the oxygen uptake per hectare of pond area is to artificially increase the water's surface area by agitation or by spraying water into the air. While effective, this is limited in its efficiency because surface waters used in the process are already close to maximum oxygen saturation, and the droplets have limited flight time. Typically, these processes result in the aerobic biological activity restricted predominately to the surface waters, in the upper 0.5 meters, and the oxygen concentrations typically decrease to very low levels after only one meter of depth.

Alternatively, water from the lower depths of the pond can be pumped to the surface, but care needs to be taken so as not to disturb the necessary stratification containing the anaerobic biological process. Pumping the water to the surface from the bottom of the pond's aerobic layer works well because the deeper water is almost devoid of free oxygen, and even without spraying it into the air, the action of simply spreading it on the surface allows wind and gentle wave action to provide an effective exchange mechanism. Thus, the principle here is to improve gas exchange rates by exposing water to air, such that the difference in partial pressure is maximized; there are many effective sewage treatment facilities that depend on this principle.

This invention combines the above concepts in conjunction with a novel means of using an airlift pump to transport large volumes of deep pond water to the surface. Thus, the pond gains some oxygen from the bubble aeration of the airlift pump, but much more from exposing large volumes of low oxygen content water to the pond's surface to facilitate natural adsorption of oxygen. This also effectively provides high mass turnover rates of the top five or more meters of surface waters, thus extending the working aerobic volume by an order of magnitude, which has a positive impact on the overall BOD oxidation capacity.

While the use of airlift pumps in wastewater treatment facilities is almost ubiquitous, their application is predominately for pumping of water and slurries to an elevated level. Some plants use bubbler aeration and some have enclosed the bubbler in a duct to induce a pumping effect, in order to move the liquid around enclosed circuits. Furthermore, airlift pump designs currently used in wastewater treatment ponds for circulation, almost completely oxygenate the water as it rises in the airlift pump, thus the water pumped to the surface is now close to saturation and will only absorb minimal amounts of the additional oxygen available at the surface. This invention is designed to an entirely different set of criteria, that of maximizing the volume of water from a given amount of pressurized air (25), where the oxygen transfer from the bubbling supplies less. than 50% of the total oxidative activity imparted to the pond, and the remaining oxygenation is a result of exposing large volumes of water, with a low partial-pressure of oxygen to the pond's surface.

DESCRIPTION OF INVENTION

The invention comprises an airlift pump (FIG. 1) that is optimized to transfer large volumes at very low pumping head. In this case the pump's inlet (1) and the outlet (2) are both below the pond's surface (23). The pumping force driving the water flow is supplied by the weight of the volume of water displaced by bubbling air (4) into a vertical pipe (5), and this energy is dissipated by the friction of the rising bubbles (4, 6), pipe entrance head, plus the frictional effects of the inner pipe wall (7) and the energy contained in the water's exit velocity (8).

By mathematically equating losses in pumping energy to the driving force of the air bubbles, an optimum pipe geometry is established, however, the results of this approach fail to accommodate the dynamics of rising bubbles. Work by Stenning and Martin [An analytical and experimental study of airlift pump performance. April 1968, ASME p 106-110] shows that the optimum pipe diameter (9) required to most effectively harness the pumping action of rising bubbles, needs to be small enough to minimize reverse turbulent flow of water around the rising bubbles. This optimum diameter is effectively defined by the velocity slip ratio between the water velocity and the bubbles, which varies for different pumping heads. However, using this smaller pipe diameter derived from Stenning's approach greatly increases the fluid's velocity and the dynamic, frictional losses increase substantially, thus reducing the total volume of water that could potentially be pumped if a larger pipe cross section with lower velocity were employed. Furthermore, the total pumping force available is decreased using the Stenning approach because at a fixed air injection rate, the volume of air held up in the pipe at any one time decreases with the rising water's increasing velocity. This invention utilizes the optimum geometry for initially inducing flow by optimizing Stenning's flow equations using conditions of extremely low pumping head, which were outside the scope of Stenning's published work. The invention then slows the flow substantially before discharge, using the velocity changes to induce higher total discharge flows from between the upper pipe sections. It can be shown that halving the pumping velocity almost doubles the bubble holdup volume and hence doubles the total pumping force. Halving the velocity also quarters the resistance to flow. These effects combined provide a substantial improvement in total flow from an airlift pump. With these considerations optimized, the resultant increase in pumping rate is dramatic. One volume of air capable of inducing up to 200 volumes of water and if the pumping flows are smoothed, flow ratios approaching 400:1 can be achieved, which contrasts with the pumping ratios of less than 10:1 for most airlift pumps. It should be noted however, that most airlift pumps are designed to pump against a head to lift water above the level of a pond, and the performance characteristics of the design improvements contained in this patent are not suitable for that application.

The airlift pump described in this invention is not fundamentally limited in scale but several factors tend to limit the practical size when used in large ponds. Currently, ponds in excess of half to one hectare appear to be better served by using multiple pumps rather than a larger design. This is because the increased aeration efficiency of the invention is dependent on the pump maintaining an area around the pump where the water's surface is moving significantly faster than the average motion induced by natural forces. This is important because the exchange of gases at the water/air interface is enhanced by orders of magnitude more by slight movements of water than by a similar movement of air. Practical scale up is limited by the pump's ability to effect surface movements by more than 25 to 55 meters radially.

This invention uses a submerged airlift pipe riser comprised of multiple concentric pipes (10, 11, 12) wherein the pipe diameters increase as the pumped water rises. The pipe sections are open-ended and each lower cylindrical section terminates in the close proximity to the next cylindrical section (13). Thus, the airlift induced flow from the lowest pipe will draw in additional water from the gap (13) between the walls of each additional section. The effect is similar to an induction pump and research to date indicates the radial increase should be between 0.05 and 0.15 meters for most wastewater pond applications. After allowing a certain pipe length (14) for the flow to stabilize across the newly expanded diameter, a further pipe (12) expansion can be initiated, and additional sections of increasing diameter can be added as required. A minimum of two diameters and ideally twice this length should be allowed in order to suitably stabilize the flow prior to increasing the pipe's diameter. The incremental increases in pipe diameter are designed to slow the rising column of water and hence minimize the kinetic energy losses on discharge. The changing diameters also has an additional effect of slowing the velocity of the bubbles and therefore increasing the pumps driving force, which is proportional to the total volume of air held up in the column at any one time. Furthermore, the transition from one pipe diameter to the next affords a redistribution of the bubbles which lessons their tendency to coalesce, a process that would otherwise accelerate the bubble's rise.

Further enhancements can be added to maximize the pumped volume by reducing the energy losses of the pumping system. Firstly, the entrance losses can be minimized by suitable outward flaring of the bottom of each cylindrical section (15) and flaring of the exit of the most upper section (16) to ensure less entrance and exit turbulence. In addition, the cylinder sections should be tapered to accommodate the expansion of gas bubbles. This is significant because once the water is accelerated into the base of a pipe riser, there is no need to accelerate it further, which'will happen if the rising cross-section occupied by water in each pipe section does not remain constant. In this case, approximately 0.4 degree taper is sufficient for all sections except that section within a meter of the surface where the taper doubles. Furthermore, the upper most section's taper can be increased substantially in conjunction with the final flaring such that a flow diverter (17) similar to an inverted 'witches-hat' can be used to smoothly direct the vertical flow to a horizontal flow while avoiding any unnecessary flow acceleration. The flow diverter (17) also provides buoyancy for the pipe suspended below it, such that the submergence depth of the top pipe flare can be set accurately. A ring of buoyant material (3) is also attached to the pipe sections to ensure the upper pipe has only slight negative buoyancy. The lower pipe sections are anchored (22) to ballast on the bottom of the pond (26), and the lower pipe sections have a positive buoyancy to ensure location directly above the ballast. Guardrails (not shown) enable the pipe sections to stay on center while they concatenate to automatically adjust to pond depth fluctuations. The flaring of the upper section is extended some distance in a horizontal plane (18) to smooth the radial flow of water onto the pond's surface.

The same idea can also be extended to many other pipe shapes.

This invention is designed to maximize the volume of water transferred from the bottom of the aerobic zone to the surface and is not solely dependent on the oxygen transfer from the injected air (19). While it is optimal to maximize the depth of the air injection point at the lowest part of the deepest section of the pump, this is not essential. However, the pump's efficiency will decrease very significantly at air injection depths less than two meters. The invention also permits the use of partial depth injection as a means of reducing the total flow or to take advantage of an available lower air pressure supply. A further variation of the invention permits the air to be injected into the upper section of the lowest pipe. Ideally, there should be 2 meters of pipe above the air injection point to allow for efficient energy transfer between the water and the initially accelerating bubbles. When using this approach it is best to flare the pipe above the injection point to compensate for the volume occupied by the injected air, to minimize further acceleration of the water.

Obviously, numerous variations and modifications can be made without departing from the spirit of the present invention. Therefore, it should be clearly understood that the form of the present invention described above and shown in the figure of the accompanying drawing is illustrative only and not intended to limit the scope of the present invention.

DESCRIPTION OF DRAWINGS

FIG. 1 shows a cross-section of a three-stage airlift pump located in a water impoundment.

What I claim for my invention is:

1. An airlift pump suitable for transporting large volumes of water to a water surface at low pumping head comprising:
    at least three vertically-mounted, concentric opened-ended pipe sections,
        having diameters increasing from lower sections to upper sections with expanding tapers of less than two degrees, with a top end of each lower section positioned in close proximity to a bottom end of an upper section and positioned such that airlift induced water is able to flow upwardly through a resulting gap between the walls of each such section, and
        having the bottom of each pipe section flared and the flare on the uppermost pipe extending up to 2 meters radially and predominantly horizontally, and
    an air input positioned at the bottom of the lowest pipe section;
    whereby, in operation, the top of the uppermost section is not above the surface and water rises from the bottom sections to the top section and flows radially at the water surface from the top section.

2. An airlift pump of claim 1 wherein the upper pipe sections have controlled buoyancy and are mounted to concatenate with water depth fluctuation.

3. An airlift pump of claim 2 wherein the length of each pipe section is at least twice the diameter of that section.

4. An airlift pump of claim 3 wherein the pipe sections have a circular cross-section.

5. An airlift pump of claim 4 in which a flow diverter is mounted at the top of the uppermost pipe section such that in combination with the flaring of the upper pipe section the resulting geometry presents a constant cross section to the water flow.

6. An airlift pump of claim 1 in which a flow diverter is mounted at the top of the uppermost pipe section.

7. An airlift pump suitable for transporting large volumes of water to a water surface at low pumping head comprising:
    vertically-mounted, multiple, concentric opened-ended pipe sections,
        having diameters increasing from lower sections to upper sections, with a top end of each lower section positioned in close proximity to a bottom end of an upper section and positioned such that airlift induced water is able to flow upwardly through a resulting gap between the walls of each such section, and
    an air input positioned to bubble air through at least one pipe section;
    whereby, in operation, the top of the uppermost section is not above the surface and water rises from the bottom sections to the top section and flows radially at the water surface from the top section, and
    wherein the upper pipe sections have controlled buoyancy and are mounted to concatenate with water depth fluctuation.

8. An airlift pump of claim 7 having at least three pipe sections.

9. An airlift pump of claim 7 wherein the top of the uppermost section is flared.

10. An airlift pump of claim 7 wherein the bottoms of the pipe sections are flared.

11. An airlift pump of claim 7 wherein the cross-sectional shape of the pipe sections is a circle, a rectangle, or a polygon.

12. An airlift pump of claim 7 wherein the length of each pipe section is at least twice the diameter of that section.

13. An airlift pump suitable for transporting large volumes of water to a water surface at low pumping head comprising:
    vertically-mounted, multiple, concentric opened-ended pipe sections,
        having diameters increasing from lower sections to upper sections, with a top end of each lower section positioned in close proximity to a bottom end of an upper section and positioned such that airlift induced water is able to flow upwardly through a resulting gap between the walls of each such section, and
    an air input positioned to bubble air through at least one pipe section;
    whereby, in operation, the top of the uppermost section is not above the surface and water rises from the bottom sections to the top section and flows radially at the water surface from the top section, and
    wherein at least one pipe section has an expanding upward taper of less than two degrees.

14. An airlift pump of claim 13 having at least three pipe sections.

15. An airlift pump of claim 13 wherein the upper pipe sections have controlled buoyancy and are mounted to concatenate with water depth fluctuation.

16. An airlift pump suitable for transporting large volumes of water to a water surface at low pumping head comprising:
    vertically-mounted, multiple, concentric opened-ended pipe sections,
        having diameters increasing from lower sections to upper sections, with a top end of each lower section positioned in close proximity to a bottom end of an upper section and positioned such that airlift induced water is able to flow upwardly through a resulting gap between the walls of each such section, and
    an air input positioned to bubble air through at least one pipe section;

whereby, in operation, the top of the uppermost section is not above the surface and water rises from the bottom sections to the top section and flows radially at the water surface from the top section, and wherein the top of the uppermost section is flared to smoothly transition the vertical flow to a horizontal direction and the flare extends up to 2 meters radially and predominantly horizontally.

17. An airlift pump of claim 16 having at least three pipe sections.

18. An airlift pump of claim 16 wherein the upper pipe sections have controlled buoyancy and are mounted to concatenate with water depth fluctuation.

19. An airlift pump of claim 16 wherein the bottoms of the pipe sections are flared.

20. An airlift pump of claim 16 in which a flow diverter is mounted at the top of the uppermost pipe section.

* * * * *